US011537325B2

(12) United States Patent
Muthiah

(10) Patent No.: US 11,537,325 B2
(45) Date of Patent: Dec. 27, 2022

(54) STORAGE SYSTEM AND METHOD FOR TOKEN PROVISIONING FOR FASTER DATA ACCESS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,480

(22) Filed: Feb. 17, 2021

(65) Prior Publication Data

US 2022/0155998 A1    May 19, 2022

Related U.S. Application Data

(60) Provisional application No. 63/114,891, filed on Nov. 17, 2020.

(51) Int. Cl.
*G06F 3/06* (2006.01)
*G06F 12/10* (2016.01)

(52) U.S. Cl.
CPC .......... *G06F 3/0659* (2013.01); *G06F 3/0611* (2013.01); *G06F 3/0679* (2013.01); *G06F 12/10* (2013.01); *G06F 2212/1024* (2013.01); *G06F 2212/657* (2013.01)

(58) Field of Classification Search
CPC .... G06F 3/0659; G06F 3/0611; G06F 3/0679; G06F 12/10; G06F 2212/1024; G06F 2212/657; G06F 2212/7201; G06F 2212/7207

See application file for complete search history.

(56) References Cited

U.S. PATENT DOCUMENTS

| 5,619,671 A | 4/1997 | Bryant et al. |
| 8,117,374 B2 | 2/2012 | Kim et al. |
| 2005/0262361 A1* | 11/2005 | Thibadeau .............. G06F 21/80 713/193 |
| 2006/0179212 A1* | 8/2006 | Kim .................... G06F 12/0246 711/E12.008 |
| 2007/0156987 A1* | 7/2007 | Chen ................... G06F 12/1458 711/163 |
| 2016/0246530 A1 | 8/2016 | Mylavarapu |

(Continued)

OTHER PUBLICATIONS

Li, Xiang, Zhou Da, and Xiaofeng Meng. "A new dynamic hash index for flash-based storage." 2008 The Ninth International Conference on Web-Age Information Management. IEEE, 2008. (Year: 2008).*

(Continued)

*Primary Examiner* — Kalpit Parikh
(74) *Attorney, Agent, or Firm* — Crowell & Moring LLP

(57) ABSTRACT

A storage system and method for token provisioning for faster data access are provided. In one embodiment, a storage system is provided comprising a memory and a controller. The controller is configured to receive a write command from a host to write data in the memory; write the data in the memory at a starting physical address; provide the host with a token indicating the starting physical address; receive a read command and the token from the host; and read the data stored in the memory at the starting physical address as indicated by the token. Other embodiments are provided.

20 Claims, 6 Drawing Sheets

(56) References Cited

U.S. PATENT DOCUMENTS

2016/0274797 A1    9/2016  Hahn
2019/0310788 A1*  10/2019  Zhang .................. G06F 3/0608
2021/0240608 A1*  8/2021  Jean .................... G06F 12/1408

OTHER PUBLICATIONS

U.S. Appl. No. 16/444,418, filed Jun. 18, 2019, entitled "Storage System and Method for Enabling Host-Driven Regional Performance in Memory,"
U.S. Appl. No. 16/708,054, filed Dec. 9, 2019, entitled "Storage System and Method for Caching a Single Mapping Entry for a Random Read Command."

* cited by examiner

STORAGE SYSTEM AND METHOD FOR TOKEN PROVISIONING FOR FASTER DATA ACCESS

CROSS-REFERENCE TO RELATED APPLICATION

This application claims the benefit of U.S. provisional patent application No. 63/114,891, filed Nov. 17, 2020, which is hereby incorporated by reference.

BACKGROUND

A host can store data in and retrieve data from a memory in a storage system. In a typical write operation, the host sends a write command with data and a logical address to the storage system. The storage system stores the data in a physical address in the memory and updates a logical-to-physical address map to associate the logical address received from the host with the physical address in the memory that stores the data. In a typical read operation, the host sends a read command with a logical address to the storage system. Using the logical-to-physical address map, the storage system translates the logical address into a physical address in the memory, reads the stored data from the physical address, and returns the data to the host.

DETAILED DESCRIPTION

Overview

Figure 1A:
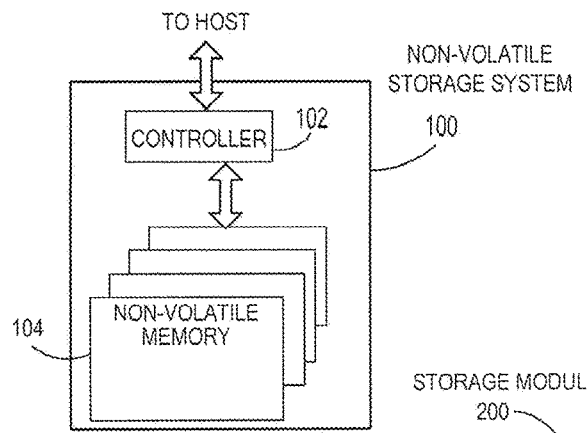
FIG. 1A is a block diagram of a non-volatile storage system of an embodiment.

By way of introduction, the below embodiments relate to a storage system and method for token provisioning for faster data access. In one embodiment, a storage system is provided comprising a memory and a controller. The controller is configured to receive a write command from a host to write data in the memory; write the data in the memory at a starting physical address; provide the host with a token indicating the starting physical address; receive a read command and the token from the host; and read the data stored in the memory at the starting physical address as indicated by the token.

In some embodiments, the read command comprises a starting logical address, and wherein the controller reads the data stored at the starting physical address as indicated by the token without first waiting to translate the starting logical address received in the read command into a translated physical address.

In some embodiments, the controller is further configured to determine whether the starting physical address as indicated by the token matches the translated physical address.

In some embodiments, the controller is further configured to: in response to determining that the starting physical address as indicated by the token matches the translated physical address, send the data read from the memory to the host.

In some embodiments, the controller is further configured to: in response to determining that the starting physical address as indicated by the token does not match the translated physical address, abort the write command to prevent sending the data read from the memory to the host.

In some embodiments, the controller is further configured to: in response to determining that the starting physical address as indicated by the token does not match the translated physical address, send the data read from the memory to the host along with a warning of token corruption.

In some embodiments, the controller is further configured to: in response to determining that the starting physical address as indicated by the token does not match the translated physical address, read the data stored in the memory at the translated physical address and send that data to the host.

In some embodiments, the controller is further configured to write the data in a block of the memory that does not undergo garbage collection for a period of time.

In some embodiments, the period of time is a single power cycle.

In some embodiments, the period of time is a plurality of power cycles.

In some embodiments, the block comprises single-level cell (SLC) memory.

In some embodiments, the controller is further configured to provide the host with the token in response to a request from the host.

In some embodiments, the memory comprises a three-dimensional memory.

In another embodiment, a method is provided that is performed in a storage system comprising a memory. The method comprises receiving a write command from a host to write data in the memory; writing the data at a physical address in the memory; providing the physical address to a host; receiving, from the host, a read command comprising a logical address and the physical address; and reading the data from the physical address in the memory without first completing a logical-to-physical address translation operation.

In some embodiments, the physical address is provided to the host and received from the host via a token.

In some embodiments, the method further comprises verifying the physical address received from the host.

In some embodiments, the method further comprises providing the physical address to the host in response to a request from the host.

In another embodiment, a storage system is provided comprising: a memory; means for writing data in the memory at a physical address; means for providing a host with the physical address; and means for, in response to receiving, from the host, a read command comprising a logical address and the physical address, reading the data from the physical address in the memory without first completing a logical-to-physical address translation operation on the logical address.

In some embodiments, the physical address is provided to the host and received back from the host via a token.

In some embodiments, the physical address is provided to the host in response to a request from the host.

Other embodiments are possible, and each of the embodiments can be used alone or together in combination. Accordingly, various embodiments will now be described with reference to the attached drawings.

Embodiments

Figure 1B:
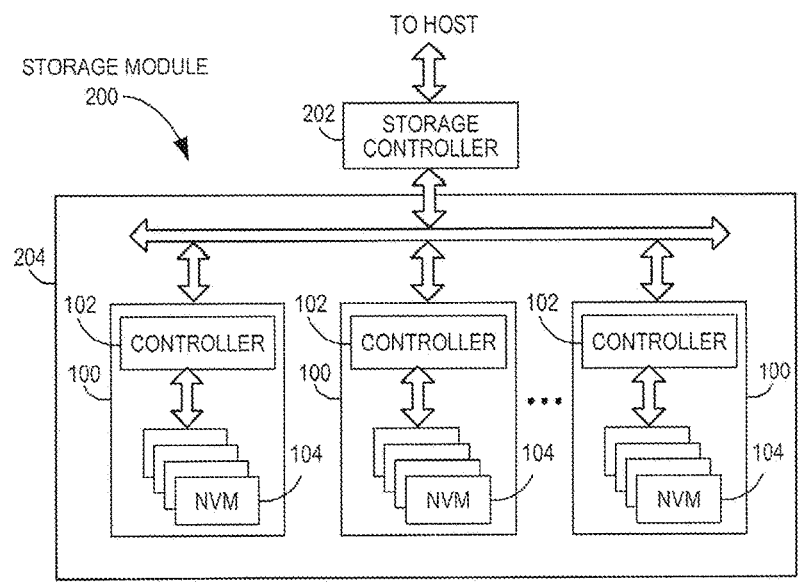
FIG. 1B is a block diagram illustrating a storage module of an embodiment.
Figure 1C:
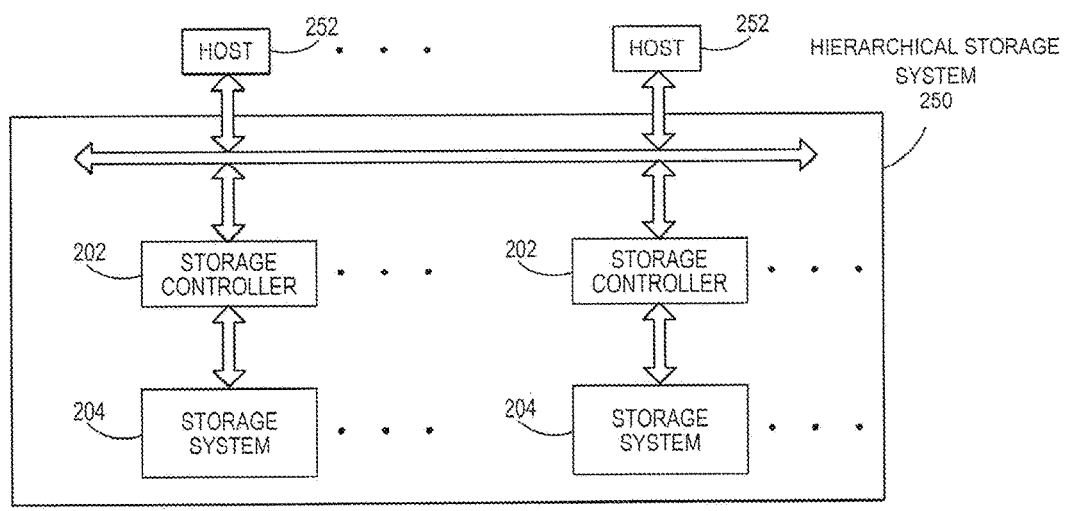
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
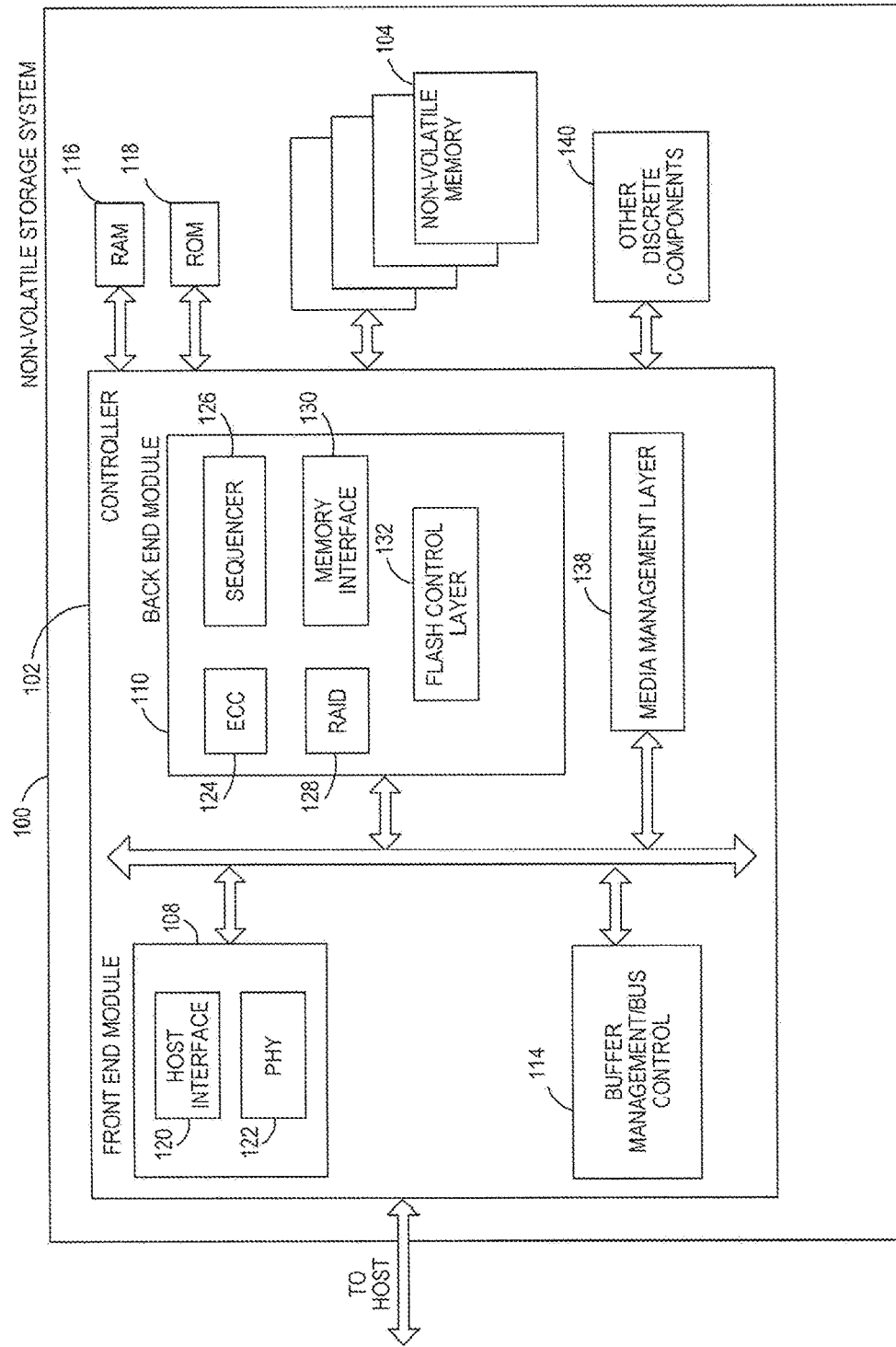
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
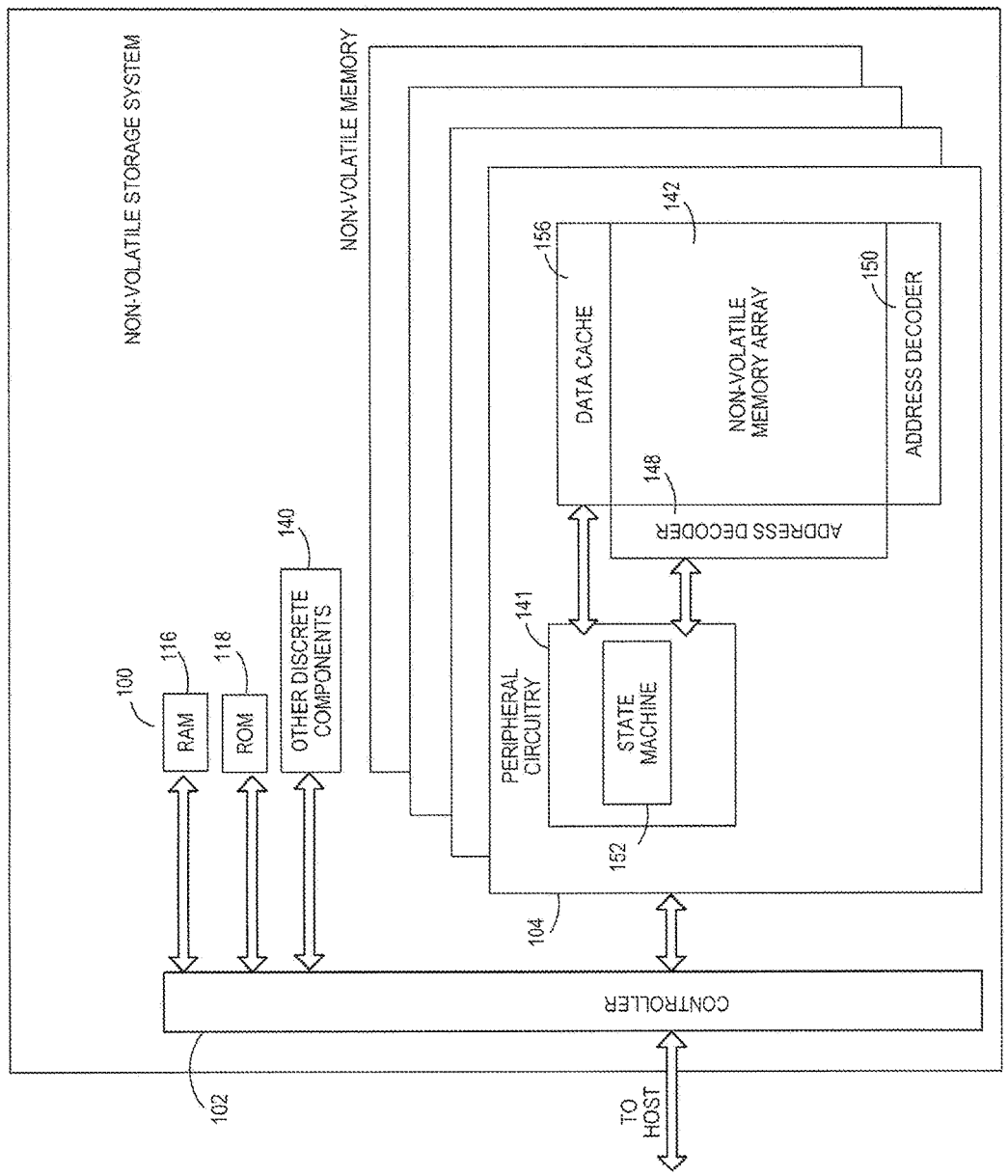
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
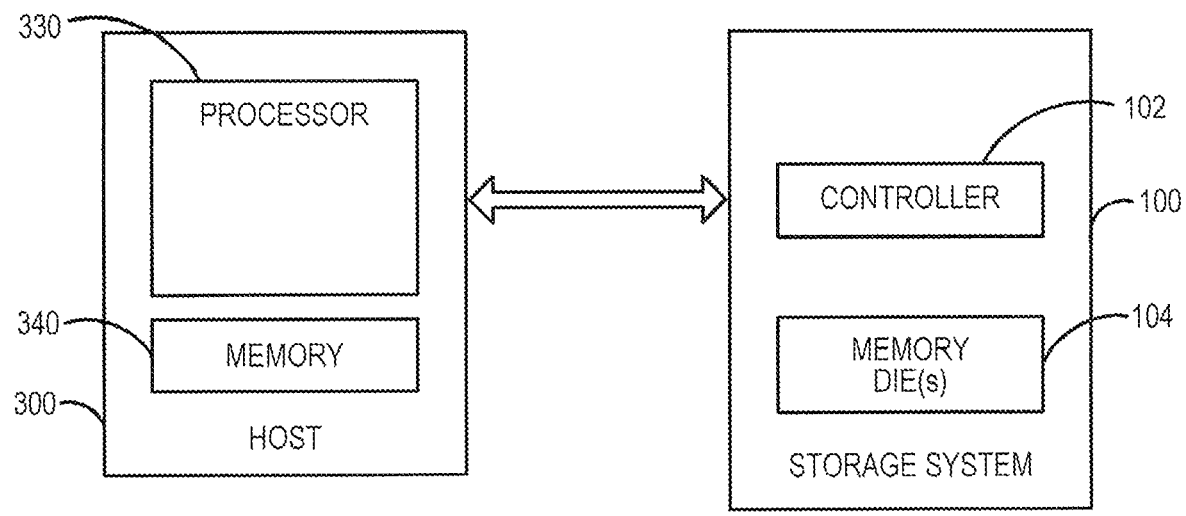
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, the host 300 can store data in and retrieve data from the memory 104 in the storage system 100 (sometimes referred to herein as "the device"). In a typical write operation, the host 300 sends a write command with data and a logical address to the storage system 100. The controller 102 in the storage system 100 stores the data in a physical address in the memory 104 and updates a logical-to-physical address map to associate the logical address received from the host 300 with the physical address in the memory 104 that stores the data. In a typical read operation, the host 300 sends a read command with a logical address to the storage system 100. Using the logical-to-physical address map, the controller 102 translates the logical address into a physical address in the memory 104 (which is sometimes referred to herein as "L2P resolution"), reads the stored data from the physical address, and returns the data to the host 300.

In one embodiment, the logical-to-physical address translation can be done using a flash translation layer (FTL) that includes a logical-to-physical address (L2P) map/table that can translate logical block addresses ("LBAs") used by the host 300 to physical addresses in the memory 104. In some embodiments, the storage system 100 maintains the logical-to-physical address map. However, in other embodiments, the host 300 maintains the logical-to-physical address map, and the storage system 100 only provides memory services. One disadvantage of the storage system 100 maintaining the logical-to-physical address map is that the storage system 100 typically has a small cache in which to cache relevant portions (pages) of the logical-to-physical address map from the memory 104. So, the storage system 100 needs to swap relevant portions (pages) of the logical-to-physical address map in and out of the cache as required. This can negatively affect random performance of the storage system 100, especially in the read path.

To address this problem, several different types of logical-to-physical address map page management techniques can be used. For example, the storage system 100 can use machine learning to identify the best page to pre-cache, can bias its controller logic for caching for different logical regions, and/or can opt to choose partial pages for fast caching. Alternatively, the storage system 100 can cache partial or full logical-to-physical address map pages in the host's memory 340 (e.g., in a host memory buffer (HMB)). However, this alternative requires a good amount of host support and host cache reservation.

Figure 4:
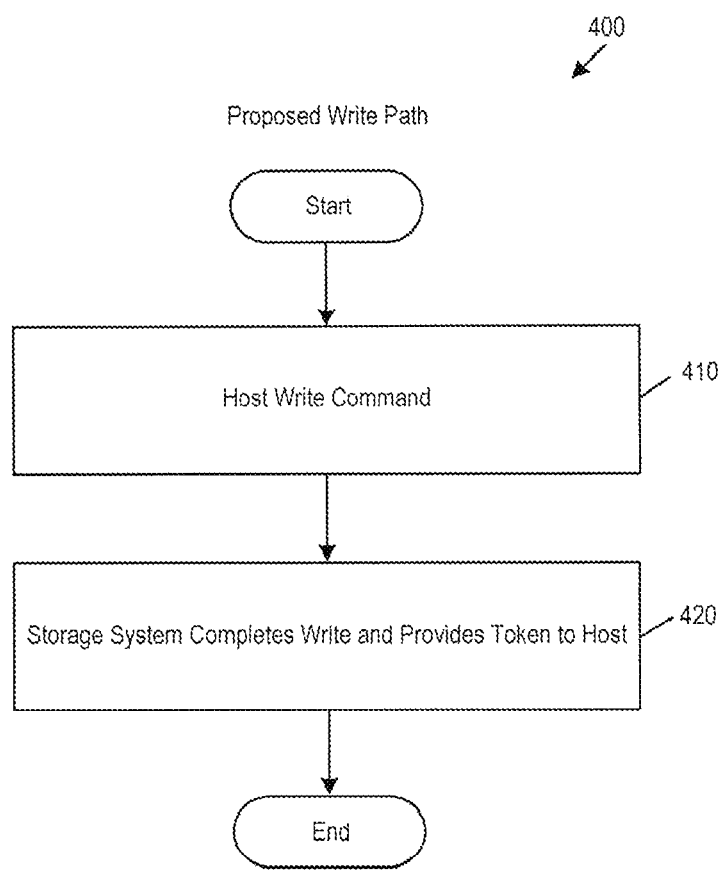
FIG. 4 is a flow chart of a method used in a write path of an embodiment.

The following embodiments provide another solution that can be used as an alternative to or in addition to the approaches mentioned above. This embodiment will be discussed in conjunction with the flow chart 400 in FIG. 4. As shown in FIG. 4, the storage system 100 receives a write command from the host 300 (act 410). The write command contains the data to be written in the memory 104 and a logical address at which the data is to be written. When the data to be written is large enough to be stored in multiple blocks in the memory 104, the provided logical address is the starting logical address. For simplicity, the phrase "logical address" broadly refers to either the sole logical address at which data is to be stored or a starting logical address, wherein the data is stored over multiple logical addresses. The same holds for the terms "physical address" and "starting physical address."

The controller 102 stores the data in a physical address in the memory 104 and updates a logical-to-physical address map to associate the logical address received from the host 300 with the physical address in the memory 104 that stores the data. Additionally, in this embodiment, the controller 102 provides the host 300 with a token indicating the physical address, either automatically upon write completion or in response to a request from the host 300 (act 420). As used herein, a "token" is any suitable mechanism to provide the physical address between the storage system 100 and the host 300. For example, the token can be a predetermined string of data that is uniquely formatted as a vehicle to communicate the physical address, a defined or generic field in a communication protocol, etc. In a simple case, the token can be just an L2P value: the physical address of a particular starting logical block address (LBA). Alternatively, the physical address can simply be transmitted by itself (i.e., not as part of a token).

Providing the token to the host 300 can improve random read performance and address the problems noted above. For example, by the host 300 providing the physical address to the storage system 100 in the read command, the storage system 100 does not need to wait for a translation of a logical address to a physical address to be completed, thereby avoiding the L2P map page management problems discussed above. That is, the use of a token allows for a quick-access read operation because, using the token, the storage system 100 can perform direct data access and skip the L2P resolution step.

It is possible that events, such as memory corruption or driver mismanagement, can lead to the physical address in a token being incorrect. Accordingly, in one embodiment, the storage system 100 can perform a verification operation on the physical address received from the host 300. While this verification can be done at any suitable time, in one embodiment, the verification is done, at least partially, in parallel with the read operation. This alternative is shown in the flow chart 500 in FIG. 5.

Figure 5:
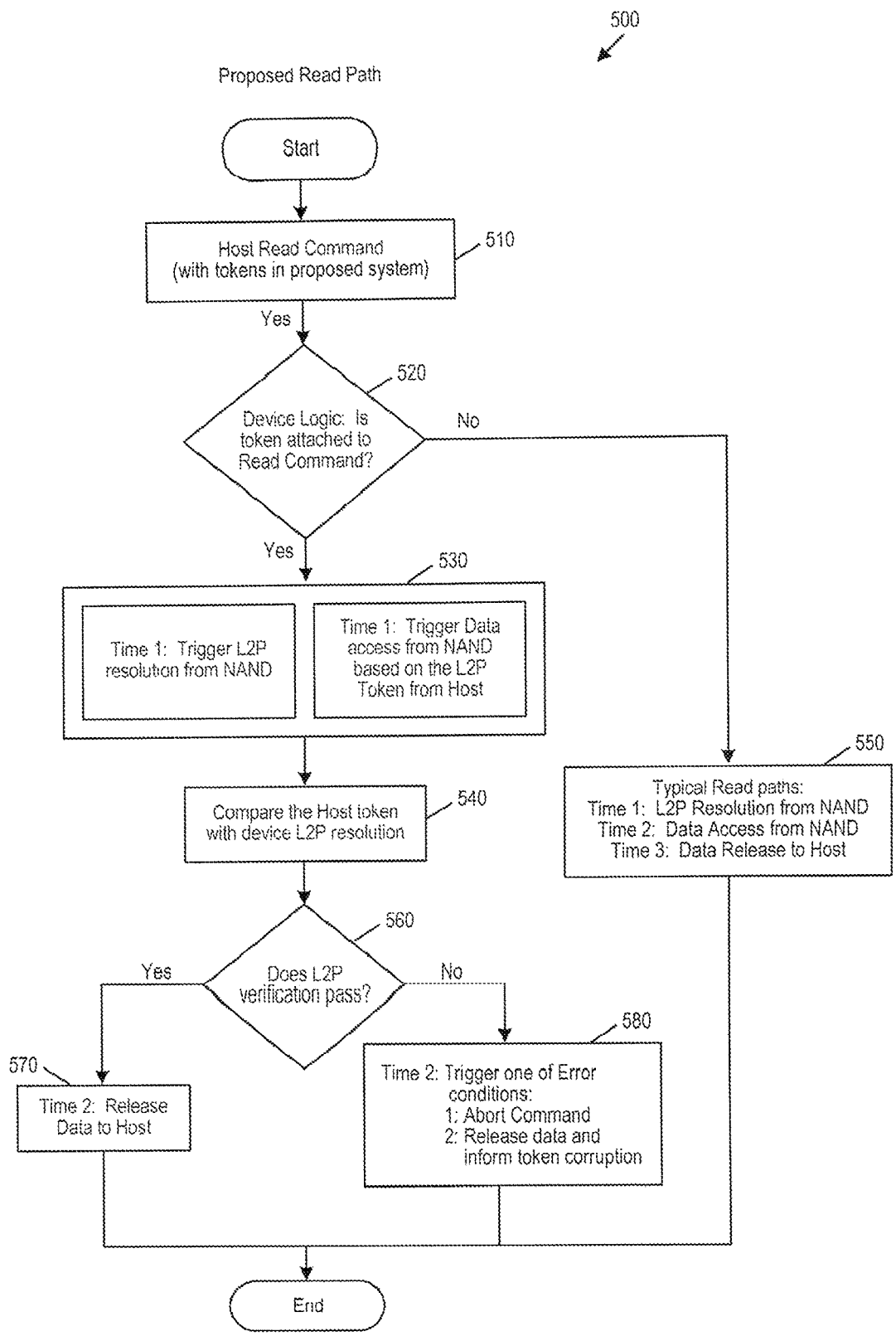
FIG. 5 is a flow chart of a method used in a read path of an embodiment.

As shown in FIG. 5, the host 300 sends a read command and a token to the storage system 100 (act 510). The controller 102 (e.g., device logic) in the storage system 100 determines if a token is attached to the read command (act 520). If it isn't, the controller 102 follows a typical read path (act 550). For example, the controller 102 can retrieve the relevant page of the logical-to-physical address map from the memory 104 and find the physical address associated with the starting logical block address in the read command (L2P resolution from NAND) at Time 1, read the data from the memory 104 starting at the physical address at Time 2, and then return the read data to the host 300 at Time 3.

However, if the token is attached to the read command (act 520), the controller 102 performs a verification step (act 530). Namely, the controller 102 reads the relevant page of the logical-to-physical address map and finds the physical address associated with the starting logical block address in the read command (L2P resolution from NAND) at Time 1. In parallel to this (i.e., also at Time 1), the controller 102 reads data from the memory 104 starting the physical address provided in the token. The controller 102 then compares the physical address from the token with the physical address retrieved from the logical-to-physical address table to determine if the physical addresses match (acts 540 and 550). If they match, the data earlier retrieved from the memory 104 is the data that the host 300 is requesting, and the storage system 100 releases that data to the host 300 at Time 2 (act 570). On the other hand, if the two physical addresses do not match, the data earlier retrieved from the memory 104 is not the data that the host 300 is requesting. As such, the controller 102 triggers an error condition at Time 2, such as aborting the command or releasing the data to the host 100 with a warning that the token is corrupted (act 580). Or on verification failure, the storage system 100 can prioritize its L2P resolution against the token, releasing re-fetched data based on its own L2P map (i.e., reading the data stored in the memory 104 at the translated physical address and sending that data to the host 300).

It should be noted that token verification is not necessarily required. For example, token verification (along with translating the logical address received from the host 300 into a translated physical address) can be avoided if it is assumed that a token received from the host 300 is dependable. Avoiding logical-to-physical address translation in this alternative improves input/output operations per second (IOPS) even further.

There are many alternatives that can be used with these embodiments. For example, as noted above, the host 300 can request the token from the storage system 100, instead of the storage system 100 providing the token with every successful write operation. In one alternative, for each write command, the processor 330 in the host 300 can determine if it needs fast read access to the data (e.g., data that is latency critical) and, if so, specifically request a token for that write operation. Selectively receiving tokens may be desired to reduce host overhead, as use of a token may incur caching overhead for the host 300. However, since caching a token consumes less cache space than caching an entire L2P map, token caching requires less overhead than the management approaches discussed above where the host memory buffer stores some or all of the map.

Also, the host 300 can access data without tokens for commands for which it has tokens. In this situation, the storage system 100 could behave as in a typical approach with L2P resolution followed by data access. That is, the host 300 may not be obligated to use a token that it has if faster data access is not required.

Another alternative is related to garbage collection. Because performing garbage collection can move data from one physical address to another, if the data associated with a token is subject to garbage collection, the physical address in the token may no longer be valid. To address this situation, when a token is desired, the storage system 100 can write the data in a separate block in memory 104 that does not undergo garbage collection (e.g., both compaction and folding) for a period of time (e.g., a single power cycle or a plurality of power cycles). After this period of time, garbage collection can be performed, and the correctness of the token/physical address cannot be guaranteed. In one embodiment, the separate block of memory comprises single-level cell (SLC) memory. This is consistent with the treatment of random data that is stored in an SLC block to avoid folding where it is expected that the data will become invalidated prior to folding.

There are many advantages associated with these embodiments. As noted above, by using the token, data requested in a read command from the host 300 can be read from the memory 104 without first waiting for completion of a logical-to-physical address translation (if one is even performed at all, e.g., for verification). Avoiding such translation or doing at least some of it in parallel with a data read can improve random read input/output operations per second (IOPS). Also, these embodiments can be used in any suitable environment. For example, these embodiments can be used for reading random data (e.g., when the storage system 100 uses four kilobyte (KB) flash management units (FMUs). These embodiments can also be used for sequential commands, where multiple tokens can be used for data that is physically fragmented and placed in multiple blocks.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
   receive, from a host, a write command to write data in the memory;
   write the data in the memory at a starting physical address;
   provide the host with a token indicating the starting physical address;
   receive, from the host, a read command comprising a starting logical address and the token;
   translate the starting logical address into a translated starting physical address using a logical-to-physical address map in the storage system;
   perform a verification operation of the token by comparing the starting physical address as indicated by the token with the translated starting physical address;
   in parallel with performing the verification operation, read the data stored in the memory at the starting physical address as indicated by the token;
   in response to the starting physical address as indicated by the token matching the translated starting physical address, send the data read from the memory to the host; and
   in response to the starting physical address as indicated by the token not matching the translated starting physical address, trigger an error condition.

2. The storage system of claim 1, wherein the controller is further configured to read the data stored at the starting physical address as indicated by the token without first waiting to translate the starting logical address received in the read command into the translated physical address.

3. The storage system of claim 1, wherein triggering the error condition comprises aborting the read command to prevent sending the data read from the memory to the host.

4. The storage system of claim 1, wherein triggering the error condition comprises sending the data read from the memory to the host along with a warning of token corruption.

5. The storage system of claim 1, wherein triggering the error condition comprises:
   reading the data stored in the memory at e translated physical address; and
   sending that data to the host.

6. The storage system of claim 1, wherein the controller is further configured to write the data in a block of the memory that does not undergo garbage collection for a period of time.

7. The storage system of claim 6, wherein the period of time is a single power cycle.

8. The storage system of claim 6, wherein the period of time is a plurality of power cycles.

9. The storage system of claim 6, wherein the block comprises single-level cell (SLC) memory.

10. The storage system of claim 1, wherein the controller is further configured to provide the host with the token in response to a request from the host.

11. The storage system of claim 1, wherein the memory comprises a three-dimensional memory.

12. The storage system of claim 1, wherein the storage system is configured to be removably connected to the host.

13. A method comprising:
   performing the following in a storage system comprising a memory:
   receiving, from a host, a write command to write data in the memory;
   writing the data at a physical address in the memory;
   providing the physical address to the host;
   receiving, from the host, a read command comprising a logical address and the physical address;
   translating the logical address into a translated physical address using a logical-to-physical address map in the storage system;

performing a verification operation of the physical address by comparing the physical address with the translated physical address;

in parallel with performing the verification operation, reading the data from the physical address without first completing the verification operation;

in response to the physical address matching the translated physical address, sending the data read from the physical address to the host; and in response to the physical address not matching the translated physical address, triggering an error condition.

14. The method of claim 13, wherein the physical address is provided to the host and received from the host via a token.

15. The method of claim 13, further comprising providing the physical address to the host in response to a request from the host.

16. The method of claim 13, wherein the storage system is configured to be removably connected to the host.

17. The method of claim 13, wherein triggering the error condition comprises aborting the read command to prevent sending the data read from the memory to the host.

18. The method of claim 13, wherein triggering the error condition comprises sending the data read from the memory to the host along with a warning of token corruption.

19. The method of claim 13, wherein triggering the error condition comprises:

reading the data stored in the memory at the translated physical address; and sending that data to the host.

20. A storage system comprising:

a memory;

means for receiving, from a host, a write command to write data in the memory;

means for writing the data at a physical address in the memory;

means for providing the physical address to the host;

means for receiving, from the host, a read command comprising a logical address and the physical address;

means for translating the logical address into a translated physical address using a logical-to-physical address map in the storage system;

means for performing a verification operation of the physical address by comparing the physical address with the translated physical address;

means for reading, in parallel with performing the verification operation, the data from the physical address without first completing the verification operation;

means for sending, in response to the physical address matching the translated physical address, the data read from the physical address to the host; and means for triggering an error condition in response to the physical address not matching the translated physical address.

\* \* \* \* \*